US006716311B1

(12) United States Patent
Decker et al.

(10) Patent No.: US 6,716,311 B1
(45) Date of Patent: Apr. 6, 2004

(54) MODIFIED CATIONIC POLYMERS, THEIR PREPARATION AND THEIR USE IN PAPERMAKING

(75) Inventors: Jürgen Decker, Speyer (DE); Norbert Mahr, Limburgerhof (DE); Anton Esser, Mannheim (DE); Hubert Meixner, Ludwigshafen (DE); Rainer Dyllick-Brenzinger, Weinheim (DE); Martin aus dem Kahmen, Ludwigshafen (DE); Martin Gercke, Darmstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/807,996

(22) PCT Filed: Oct. 29, 1999

(86) PCT No.: PCT/EP99/08265

§ 371 (c)(1),
(2), (4) Date: May 4, 2001

(87) PCT Pub. No.: WO00/26468

PCT Pub. Date: May 11, 2000

(30) Foreign Application Priority Data

Nov. 4, 1998 (DE) .......................................... 198 50 817

(51) Int. Cl.$^7$ .............................................. D21H 11/00
(52) U.S. Cl. ................................ 162/164.3; 162/164.6; 528/44; 528/59; 528/271; 528/361; 528/370; 528/403
(58) Field of Search ........................... 162/164.1, 164.3, 162/164.6; 528/44, 59, 271, 361, 370, 403

(56) References Cited

U.S. PATENT DOCUMENTS

| 5,145,559 | A | | 9/1992 | Auhorn et al. |
| 5,324,787 | A | | 6/1994 | Pinschmidt, Jr. et al. |
| 5,536,370 | A | | 7/1996 | Scherr et al. |
| 5,693,675 | A | | 12/1997 | Mandeville, III et al. |
| 6,056,967 | A | * | 5/2000 | Steuerle et al. ............. 424/401 |

FOREIGN PATENT DOCUMENTS

| DE | 197 19 059 | 11/1998 |
| EP | 0 438 707 | 7/1991 |
| EP | 0 649 941 | 4/1995 |
| WO | WO 97/25367 | 7/1997 |

OTHER PUBLICATIONS

Patent Abstracts of Japan, vol. 1998, No. 06, Apr. 30, 1998, JP 10–035090, Feb. 10, 1998.

* cited by examiner

Primary Examiner—Peter Chin
(74) Attorney, Agent, or Firm—Oblon, Spivak, McClelland, Maier & Neustadt, P.C.

(57) ABSTRACT

The invention relates to modified cationic polymers which can be obtained by reacting (a) water-soluble, polymeric compounds containing NH groups with (b) compounds which are at least bifunctional with regard to NH groups, which contain at least one alkyl radical or alkenyl radical having at least 8 C atoms, and which contain, as a functional group, a halohydrin, epoxide, carboxyl, chloroformate or isocyanate group or a halogen atom. The invention also relates to a method for producing the polymers by reacting the compounds of groups (a) and (b), and to the use of the modified cationic polymers during the production of paper as fixing agents for papermaking stock containing interfering substances.

20 Claims, No Drawings

MODIFIED CATIONIC POLYMERS, THEIR PREPARATION AND THEIR USE IN PAPERMAKING

The present invention relates to modified cationic polymers which are obtainable by reacting water-soluble polymeric compounds containing NH groups with crosslinking agents, processes for their preparation and their use in papermaking.

EP-A-0438707 discloses a process for the production of paper, board and cardboard by draining paper stock containing interfering substances in the presence of hydrolyzed homo- and/or copolymers of N-vinylformamide having a degree of hydrolysis of at least 60% and cationic retention aids.

To inhibit the deposition of pitch in papermaking, according to the process of EP-A-0649941 a water-soluble polymer which contains at least 5 mol % of an N-alkyl-N-vinylcarboxamide, N-vinylformamide, N-vinylacetamide or partially hydrolyzed N-alkyl-N-vinylcarboxamides is added to the paper stock.

U.S. Pat. No. 5,536,370 discloses condensates of polyalkylenepolyamines which are converted into crosslinked polyalkylenepolyamines by partial amidation of polyalkylenepolyamines and subsequent condensation of the partially amidated polyalkylenepolyamines with at least bifunctional crosslinking agents. These products are used in papermaking as fixing agents for soluble interfering substances.

The non-prior-published DE-A-19719059.6 discloses reaction products of amino-containing polymers with reactive sizes, in particular alkyldiketenes. The reaction products are used as fixing agents for water-soluble and for water-insoluble interfering substances in the production of paper, board and cardboard from paper stocks containing interfering substances.

U.S. Pat. No. 5,324,787 discloses modified polymers which contain vinylamine units and are obtainable by reacting polymers containing vinylamine units with saturated aliphatic or aromatic glycidyl ethers. The reaction products are used as flocculants and for increasing the retention of crills in papermaking. The aliphatic glycidyl ethers used for the modification contain from 1 to 18, particularly 4 to 12, carbon atoms in the alkyl group. The use of butyl glycidyl ether as a modifier is preferred. JP-A-10-035090 discloses polymers which are obtainable by reacting water-soluble polymeric compounds which contain NH groups and which contain, as polymerized units, monomers containing carboxyl groups and/or anhydride groups or amino groups and/or monomers containing quaternary amonium salt groups with crosslinking agent which contain two or more oxazolinyl and/or oxazolidinyl groups. The reaction products are used for the waterproofing of inkjet papers.

It is an object of the present invention to provide novel polymers which are effective as fixing agents in papermaking.

We have found that this object is achieved, according to the invention, by modified cationic polymers which are obtainable by reacting (a) water-soluble, polymeric compounds containing NH groups and selected from the group consisting of the polyalkylenepolyamines, polyamidoamines, polyamidoamines grafted with ethyleneimine and polymers containing vinylamine units with (b) compounds which are at least bifunctional with respect to NH groups and contain at least one alkyl or alkylene radical of at least 8 carbon atoms and, as functional group, a halohydrin, epoxy, carboxyl, chloroformate or isocyanate group or a halogen atom.

The present invention furthermore relates to a process for the preparation of modified cationic polymers by reacting (a) water-soluble, polymeric compounds containing NH groups and selected from the group consisting of the polyalkylenepolyamines, polyamidoamines, polyamidoamines grafted with ethyleneimine and polymers containing vinylamine units with (b) compounds which are at least bifunctional with respect to NH groups and have at least one alkyl or alkylene radical of at least 8 carbon atoms and, as functional group, a halohydrin, epoxy, carboxyl, chloroformate or isocyanate group or a halogen atom.

Compounds of group (a) are essentially water-soluble polymers containing amino and/or ammonium groups. Examples of such polymers are polyalkylenepolyamines, such as diethylenetriamine, triethylenetetramine, tetraethylenepentamine, pentaethylenehexamine, 3-(2-aminoethyl)aminopropylamine, 2-(diethylamino)ethylamine, 3-(dimethylamino)propylamine, dimethyldipropylentriamine, 4-aminoethyloctane-1,8-diamine, 3-(diethylamino)propylamine, N,N-diethyl-1,4-pentanediamine, dipropylenetriamine, bis(hexamethylene)triamine, N,N-bin(aminopropyl)methylamine, N,N-bis(aminopropyl)ethylamine, N,N-bis(aminopropyl)hexylamine, N,N-bis(aminopropyl)octylamine, N,N-dimethyldipropylenetriamine, N,N-bis(3-dimethylaminopropyl)amine, N-(aminoethyl)butylenediamine, N-(aminopropyl)butylenediamine, bis(aminopropyl)butylenediamine and polyethyleneimines. Preferably used polyalkylenepolyamines are polyethyleneimines which are prepared, for example, by polymerizing ethyleneimine in aqueous solution in the presence of acid-eliminating compounds, acids or Lewis acids. The polyethyleneimines have, for example, molar masses of from 1,000 to 5,000,000 g/mol. Polyethyleneimines having average molar masses of from 5,000 to 800,000 g/mol are particularly preferred.

Further suitable water-soluble, polymeric compounds containing NH groups are polyamidoamines which are obtainable, for example, by condensing dicarboxylic acids with polyamines. Suitable polyamidoamines are obtained, for example, by reacting dicarboxylic acids of 4 to 10 carbon atoms with polyethyleneimines (average molar masses of from 300 to 1,000 g/mol) or with polyalkylenepolyamines which contain from 3 to 10 basic nitrogen atoms in the molecule. Suitable dicarboxylic acids are, for example, succinic acid, maleic acid, adipic acid, glutaric acid, suberic acid, sebacic acid or terephthalic acid. In the preparation of the polyamidoamines, it is also possible to use mixtures of dicarboxylic acids as well as mixtures of a plurality of polyalkylenepolyamines. Suitable polyalkylenepolyamines are, for example, diethylenetriamine, triethylenetetramine, tetraethylenepentamine, dipropylenetriamine, tripropylenetetramine, dihexamethylenetriamine, aminopropylethylenediamine and bisaminopropylethylenediamine. For the preparation of the polyamidoamines, the dicarboxylic acids and polyalkylenepolyamines are heated to relatively high temperatures, for example to temperatures of from 120 to 220° C., preferably from 130 to 180° C. The water formed in the condensation is removed from the system. In the condensation, lactones or lactams of carboxylic acids of 4 to 8 carbon atoms may, if required, additionally be used. For example, from 0.8 to 1.4 mol of a polyalkylenepolyamine are used per mole of dicarboxylic acid. The weight average molecular weights of the polyamidoamines are preferably at least 1,000 g/mol.

Further amino-containing polymers are polyamidoamines grafted with ethyleneimine. They are obtainable from the polyamidoamines described above by reaction with ethyleneimine in the presence of acids, such as sulfuric acid, or Lewis acids, e.g. boron trifluoride etherates, at, for example, from 80 to 100° C. For example, from 1 to 100 parts by weight of ethyleneimine are grafted per 100 parts by weight of a polyamidoamine. Uncrosslinked polyamidoamines which may have been grafted with ethyleneimine are preferably used. Compounds of this type are described, for example, in DE-B-24 34 816.

Other suitable cationic polymers of group (a) are polyallylamines. Polymers of this type are obtained by homopolymerization of allylamine, preferably in a form neutralized with acids or in quaternized form, or by copolymerization of allylamine with other monoethylenically unsaturated monomers, as described below as comonomers for N-vinylcarboxamides.

Further water-soluble, polymeric compounds of group (a) which contain NH groups are polymers containing vinylamine units. They are prepared, for example, starting from open-chain N-vinylcarboxamides of the formula

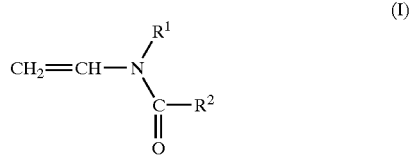

(I)

where $R^1$ and $R^2$ may be identical or different and are each hydrogen or $C_1$- to $C_6$-alkyl. Suitable monomers are, for example, N-vinylformamide ($R^1=R^2=H$ in formula I), N-vinyl-N-methylformamide, N-vinylacetamide, N-vinyl-N-methylacetamide, N-vinyl-N-ethylacetamide, N-vinyl-N-methylpropionamide and N-vinylpropionamide. For the preparation of the polymers, said monomers can be polymerized either alone, as a mixture with one another or together with other monoethylenically unsaturated monomers. Preferably, homo- or copolymers of N-vinylformamide are used as starting materials. Polymers containing vinylamine units are disclosed, for example, in U.S. Pat. No. 4,421,602, EP-A-0 216 387 and EP-A-0 251 182. They are obtained if polymers which contain the monomers of the formula I as polymerized units are hydrolyzed with acids, bases or enzymes.

Examples of monoethylenically unsaturated monomers which are copolymerized with the N-vinylcarboxamides are vinyl esters of saturated carboxylic acids of 1 to 6 carbon atoms, such as vinyl formate, vinyl acetate, vinyl propionate and vinyl butyrate, and vinyl ethers, such as $C_1$- to $C_4$-alkyl vinyl ethers, e.g. methyl or ethyl vinyl ether. Further suitable comonomers are ethylenically unsaturated $C_3$- to $C_6$-carboxylic acids, for example acrylic acid, methacrylic acid, maleic acid, crotonic acid, itaconic acid and vinylacetic acid, and their alkali metal and alkaline earth metal salts, esters, amides and nitriles of said carboxylic acids, for example methyl acrylate, methyl methacrylate, ethyl acrylate and ethyl acrylate. Further suitable carboxylic esters are derived from glycols or polyalkylene glycols, in each case only one OH group being esterified, e.g. hydroxyethyl acrylate, hydroxyethyl methacrylate, hydroxypropyl acrylate, hydroxybutyl acrylate, hydroxypropyl methacrylate, and hydroxybutyl methacrylate, and acrylic acid monoesters of polyalkylene glycols having a molar mass of from 500 to 10,000. Further suitable comonomers are esters of ethylenically unsaturated carboxylic acids with amino alcohols, for example dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, dimethylaminobutyl acrylate and diethylaminobutyl acrylate. The basic acrylates can be used in the form of the free bases, of the salts of mineral acids, such as hydrochloric acid, sulfuric acid or nitric acid, or of the salts with organic acids, such as formic acid, acetic acid, propionic acid or the sulfonic acids, or in quaternized form. Suitable quaternizing agents are, for example, dimethyl sulfate, diethyl sulfate, methyl chloride, ethyl chloride and benzyl chloride.

Further suitable comonomers are amides of ethylenically unsaturated carboxylic acids, such as acrylamide, methacrylamide and N-alkyl mono- and diamides of monoethylenically unsaturated carboxylic acids having alkyl radicals of 1 to 6 carbon atoms, e.g. N-methylacrylamide, N,N-dimethylacrylamide, N-methylmethacrylamide, N-ethylacrylamide, N-propylacrylamide and tert-butylacrylamide, and basic (meth)acrylamides, such as dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide.

Furthermore, suitable comonomers are N-vinylpyrrolidone, N-vinylcaprolactam, acrylonitrile, methacrylonitrile, N-vinylimidazole and substituted N-vinylimidazoles, e.g. N-vinyl-2-methylimidazole, N-vinyl-4-methylimidazole, N-vinyl-5-methylimidazole and N-vinyl-2-ethylimidazole, and N-vinylimidazolines, such as N-vinylimidazoline, N-vinyl-2-methylimidazoline and N-vinyl-2-ethylimidazoline. N-Vinylimidazoles and N-vinylimidazolines are used not only in the form of the free bases but also in a form neutralized with mineral acids or organic acids or in quaternized form, the quaternization preferably being effected with dimethyl sulfate, diethyl sulfate, methyl chloride or benzyl chloride. Diallyldialkylammonium halides, e.g. diallyldimethylammonium chlorides, are also suitable.

Sulfo-containing monomers, for example vinylsulfonic acid, allylsulfonic acid, methallylsulfonic acid, styrenesulfonic acid, the alkali metal or amonium salts of these acids or 3-sulfopropyl acrylate, are also suitable as comonomers for the compounds of the formula I. A further modification of the polymers containing vinylamine units can be achieved by copolymerizing up to 5 mol % of units of monomers having at least two ethylenically unsaturated double bonds. Such comonomers are usually used as crosslinking agents in copolymerizations. The presence of these comonomers during the copolymerization results in an increase in the molar masses of the copolymers. Suitable compounds of this type are, for example, methylenebisacrylamide, esters of acrylic acid and methacrylic acid with polyhydric alcohols, e.g. glycol diacrylate, glyceryl triacrylate, glycol dimethacrylate, glyceryl trimethacrylate and other polyols at least diesterified with acrylic acid or methacrylic acid, such as pentaerythritol and glucose. Other suitable crosslinking agents are divinylbenzene, divinyldioxane, pentaerythrityl triallyl ether, pentaallylsucrose, divinylurea and divinylethyleneurea.

The copolymers contain, for example, from 99 to 1, preferably from 95 to 5, mol % of
   N-vinylcarboxamides of the formula I and from 1 to 99, preferably from 5 to 95, mol % of other monoethylenically unsaturated monomers copolymerizable therewith in polymerized form.

In order to prepare polymers containing vinylamine units, it is preferable to start from homopolymers of N-vinylformamide or from copolymers which are preferably obtainable by copolymerizing N-vinylformamide with vinyl formate, vinyl acetate, vinyl propionate, acrylonitrile, N-vinylcaprolactam, N-vinylurea, acrylic acid, N-vinylpyrrolidone or $C_1$- to $C_6$-alkyl vinyl ethers and subsequently hydrolyzing the homopolymers or the copolymers with formation of vinylamine units from the polymerized N-vinylformamide units, the degree of hydrolysis being, for example, from 0.1 to 100 mol %.

The hydrolysis of the polymers described above is carried out by the action of acids, bases or enzymes by known methods. The polymerized monomers of the abovementioned formula I are converted by elimination of the group

  (II), where $R^2$ has the meanings stated in formula I, into polymers which contain vinylamine units of the formula

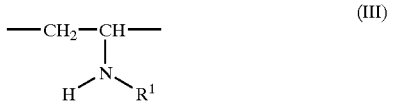  (III)

where $R^1$ has the meanings stated in formula I.

The homopolymers of the N-vinylcarboxamides of the formula I and their copolymers may have a degree of hydrolysis of from 0.1 to 100, preferably from 1 to 99, mol %. In most cases, the degree of hydrolysis of the homo- and copolymers is from 5 to 95 mol %. The degree of hydrolysis of the homopolymers is equivalent to the content of vinylamine units in the polymers. In the case of copolymers which contain vinyl esters as polymerized units, hydrolysis of the ester groups with formation of vinyl alcohol units may occur in addition to the hydrolysis of the N-vinylformamide units. This is the case in particular when the hydrolysis of the copolymers is carried out in the presence of sodium hydroxide solution. Copolymerized acrylonitrile is likewise chemically modified in the hydrolysis. Here, for example, amido or carboxyl groups form. The homo- and copolymers containing vinylamine units can, if required, contain up to 20 mol % of amidine units, which are formed, for example, by reaction of formic acid with two neighboring amino groups or by intramolecular reaction of an amino group with a neighboring amido group, for example of polymerized N-vinylformamide. The molar masses of the polymers containing vinylamine units are, for example, from 1,000 to 10 million, preferably from 10,000 to 5 million (determined by light scattering). This molar mass range corresponds, for example, to K values of from 5 to 300, preferably of from 10 to 250 (determined according to H. Fikentscher in 5% strength aqueous sodium chloride solution at 25° C. and at a polymer concentration of 0.5% by weight).

The polymers containing vinylamine units are preferably used in salt-free form. Salt-free aqueous solutions of polymers containing vinylamine units can be prepared, for example, from the salt-containing polymer solutions described above, with the aid of dialysis or ultrafiltration through suitable membranes with cut-offs of, for example, from 1,000 to 500,000, preferably from 10,000 to 300,000, Dalton. The aqueous solutions, described below, of other polymers containing amino and/or ammonium groups can also be obtained in salt-free form with the aid of dialysis or ultrafiltration. In the ultrafiltration through membranes having the abovementioned cut-offs, fractionation of the polymers resulting in polymers having a relatively narrow molar mass distribution $M_w/M_n$ is achieved in addition to removal of salts which are formed, for example, in the hydrolysis of polymers containing N-vinylformamide units with acids or bases. The fractions of polymers having a narrow distribution which are obtained as retentate in the ultrafiltration give, on reaction with the compounds of group (b), reaction products which generally have higher activity than reaction products which are formed in the reaction of unfractionated polymers of the same composition with such compounds.

The compounds (a) which contain NH groups and are preferably used for the preparation of the modified cationic polymers are polyalkylenepolyamines, polyamidoamines, polyamidoamines grafted with ethyleneimine and polymers containing vinylamine units. The molar masses of the compounds (a) containing NH groups are preferably at least 1,000 g/mol.

The compounds of group (a) are reacted with compounds (b) which are at least bifunctional with respect to NH groups and contain at least one alkyl or alkenyl radical having at least B carbon atoms and, as a functional group, a halohydrin, epoxy, carboxyl, chloroformate or isocyanate group or halogen atom. Preferred compounds of group (b) can be characterized, for example, with the aid of the following formulae:

  (IV)

  (V)

where in each case R is $C_8$- to $C_{30}$-alkyl or alkenyl, A is $C_2$- to $C_4$-alkylene, n is 0–50 and X is a halohydrin, epoxy, carboxyl, chloroformate or isocyanate group or a halogen atom.

The compounds of the formula IV are obtainable starting from. α-olefin-diols which may be alkoxylated and then provided with a functional group. Thus, for example, long-chain α-olefin-diols are reacted with preferably from 5 to 20 mol of ethylene oxide, and a halohydrin group is introduced into the reaction product by reaction with epichlorohydrin. For example, from 0.5 to 2.5, preferably from 0.9 to 1.2, mol of epichlorohydrin are used per OH group. The halohydrin groups of the formula IV can be converted into epoxy groups by treatment with, for example, aqueous bases.

The compounds of the formula V are obtained, for example, by reacting fatty acids having at least 8 carbon atoms in the molecule with, for example, diethanolamine with amide formation and, if required, alkoxylating the resulting fatty acid amides then introducing a functional group. This can most simply be effected by reacting the fatty acid amide or the alkoxylated fatty acid amides with epichlorohydrin. This gives compounds of the type of the formula V where X is a halohydrin group. By, treatment with aqueous bases, epoxy groups are formed from the halohydrin groups.

Further compounds of group (b) can be characterized, for example, with the aid of the formula

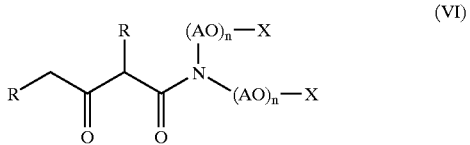

(VI)

where R is $C_8$- to $C_{30}$-alkyl or alkenyl, A is $C_2$- to $C_4$-alkylene, n is from 0 to 50 and X is a halohydrin, preferably chlorohydrin, epoxy, carboxyl, chloroformate or isocyanate group or a halogen atom, preferably a chlorine atom.

Compounds of the formula VI are obtained, for example, by reaction of diethanolamine with an alkyldiketene, such as stearyldiketene or oleyldiketene, alkoxylation, if required, with ethylene oxide, propylene oxide and/or butylene oxide, and subsequent introduction of chlorohydrin groups by reaction with epichlorohydrin.

The corresponding epoxides can be prepared from the compounds of the formula VI by treatment with bases, if X is a halohydrin group.

Other suitable compounds of group (b) are compounds of the formula

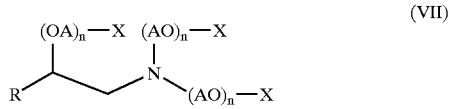

(VII)

where
R is $C_8$- to $C_{30}$-alkyl or alkenyl,
A is $C_2$- to $C_4$-alkylene,
n is 0–50 and
X is a halohydrin, epoxy, carboxyl, chloroformate or isocyanate group or a halogen atom.

Compounds of the formula VII are obtained, for example, from a long-chain α-olefin-epoxide (epoxide of 10 to 32 carbon atoms) by reaction with diethanolamine in a molar ratio of 1:3, alkoxylation, if required, with ethylene oxide, propylene oxide and/or butylene oxide and reaction with epichlorohydrin.

Other compounds (b) can be prepared, for example, by alkoxylating $C_8$- to $C_{30}$-alkylamines and reacting the products thus obtainable with epichlorohydrin. Such compounds have the formula

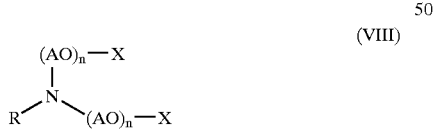

(VIII)

where
R is $C_8$- to $C_{30}$-alkyl or alkenyl,
A is $C_2$- to $C_4$-alkylene,
n is 0–50 and
X is a halohydrin, epoxy, carboxyl, chloroformate or isocyanate group or halogen atom.

The alkoxylation can be carried out with ethylene oxide, propylene oxide or butylene oxides. Ethylene oxide is preferably used. The ethoxylation of the long-chain ($C_{10}$ to $C_{32}$) α-olefin-diols, of the fatty amines or of the long-chain carboxamides is carried out in a manner known per se in the presence of the conventional catalysts, such as bases, e.g. alkali metal, alkaline earth metal or ammonium hydroxides, and of carbonates or alcoholates of alkali metals or alkaline earth metals. The alkoxylation is effected, for example, in pressure-resistant autoclaves at from 60 to 230° C. and, for example, from 1 to 10 bar. After the reaction, the reaction product is neutralized with acid and if necessary separated from the neutralized catalyst by filtration over a pressure filter, a plate filter or a glass frit.

The addition of epichlorohydrin at the OH groups of the starting compounds is preferably effected in the presence of Lewis acids at from 50 to 150° C. Processes of this type are known, cf. DE-B 2434816. Particularly preferred compounds (b) are compounds of the formula

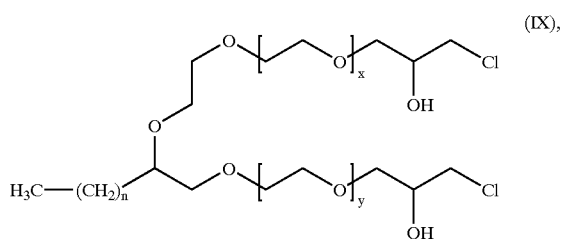

(IX), where n is 5–27 and x and y are each 0–40, which are derived from α-olefin-diols.

The novel compounds are prepared by reacting at least one
(a) water-soluble polymeric compound containing NH groups with
(b) compounds which are at least bifunctional with respect to NH groups and have at least one alkyl or alkylene radical of at least 8 carbon atoms and, as a functional group, a halohydrin, epoxy, carboxyl, chloroformate or isocyanate group or a halogen atom.

The reaction of the compounds (a) and (b) is preferably carried out in aqueous solution at from 20 to 100° C. with formation of aqueous solutions or dispersions. The weight ratio of the compounds (a) to the compounds (b) can be varied in a wide range and is, for example, from 15,000:1 to 1:1, preferably from 500:1 to 10:1. The ratios of the components (a) and (b) are chosen so that water-soluble or self-emulsifying polymers are formed. In a preferred embodiment of the novel process, a) compounds containing NH groups and selected from the group consisting of the polyalkylenepolyamines, polyamidoamines, polyamidoamines grafted with ethyleneimine and polymers containing vinylamine units are reacted with
(b) at least one compound of the formula

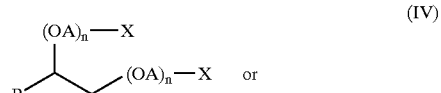

(IV)

or

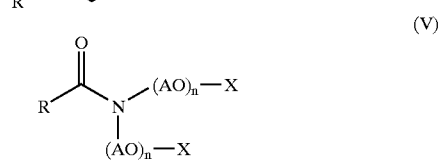

(V)

where R is $C_8$- to $C_{30}$-alkyl or alkenyl, A is $C_2$- to $C_4$-alkylene, n is 0–50 and X is a halohydrin, epoxy, carboxyl, chloroformate or isocyanate group or a halogen atom. In the formulae IV and V, X is preferably an epichlorohydrin group or the epoxy group obtainable therefrom by treatment with bases.

The modified cationic polymers which are obtainable by reaction of the compounds of the groups (a) and (b) are used in papermaking as fixing agents for paper stocks containing interfering substances. The term papermaking includes the production of paper, board and cardboard by draining of paper stock. In papermaking, stickies are frequently the cause of production faults. Stickies are tacky impurities which enter the papermaking process together, for example, with the recycled fibers in the reprocessing of waste paper. Such impurities lead to deposits on wires, felts, rolls and other moving parts of the machines. Since the water circulations in the paper mills become increasingly concentrated, anionic impurities accumulate in the recycled water and greatly impair the efficiency of cationic polymeric process chemicals in the draining of paper stock and the retention of fillers and fibers. In practice, fixing agents are used for processing paper stocks containing such interfering substances. In the absence of fixing agents, for example, defects, generally in the form of thin parts or holes, form in the paper web, with the result that on the one hand the quality of the paper produced is adversely affected and on the other hand tears may be produced in the paper web in the paper machine.

The modified cationic polymers described above are effective fixing agents for interfering substances. The fixing agents can be used for processing all fiber qualities. Water is used in practice for the preparation of the paper stock that is at least partly or completely recycled from the paper machine. This is either clarified or unclarified white water or mixtures of such water qualities. As in the case of processed waste paper, the recycled water contains larger or smaller amounts of interfering substances. Possible sources of interfering substances and stickies, in addition to resins and lignin constituents which are formed as a result of cooking and mechanical processing of wood in fiber production, are mainly dispersions, natural colloidal systems, such as starch, caseins and dextrins, and hotmelt adhesives. These may be, for example, residual constituents of chemicals and printing inks from the de-inking process and binders from paper coating slips.

Specifically, they are resins, lignin residues, adhesives from spine gluing, from pressure-sensitive adhesive labels and from envelopes and binders from coating slips and printing inks. White pitch or sticky particles occur as particles of different size or in coarsely to finely dispersed form and in different amounts, depending on the recycled material introduced, and are often removed from the stock mixture only to an insufficient extent by flotation systems or mechanical stock processing and screening systems.

The content of such interfering substances in the paper stock can be characterized, for example, by the chemical oxygen demand (COD) a cumulative parameter. The COD values of such paper stocks are from 300 to 40,000, preferably from 1,000 to 30,000, mg of oxygen/kg of the aqueous phase of the paper stock. These amounts of interfering substances considerably impair the efficiency of conventional cationic drainage and retention aids as long as they are used in papermaking in the absence of fixing agents.

Suitable fibers for the preparation of the pulps are all qualities conventionally used for this purpose, for example mechanical pulp, bleached and unbleached chemical pulp and paper stocks from all annual plants. Mechanical pulp includes, for example, groundwood pulp, thermomechanical pulp (TMP), chemothermomechanical pulp (CTMP), pressure groundwood, semi-chemical pulp, high-yield chemical pulp and refiner mechanical pulp (RMP). Suitable chemical pulps are, for example, sulfate, sulfite and soda pulps. The unbleached pulps, which are also referred to as unbleached kraft pulp, are preferably used. Suitable annual plants for the preparation of paper stocks are, for example, rice, wheat, sugar cane and kenaf. Pulps are also produced using waste paper and coated waste, which contains larger or smaller amounts of binder for coating slips and printing inks as well as starch, adhesives from pressure-sensitive adhesive labels and envelopes, dispersion residues from paper conversion and adhesives from spine gluing and hotmelts, either alone or as a mixture with other fibers. Pulps of the type described above contain larger or smaller amounts of interfering substances which, as explained above, can be characterized with the aid of the COD or with the aid of the cationic demand. The cationic demand is understood as meaning the amount of a cationic polymer which is required to bring a defined amount of the white water to the isoelectric point. Since the cationic demand is dependent to a very great extent on the composition of the cationic retention aid used in each case for the determination, a polyamidoamine which was obtained according to Example 3 of DE-C 2434816 from adipic acid and diethylenetriamine and was grafted with ethyleneimine and crosslinked with polyethylene glycol dichlorohydrin ether was used for standardization. The pulps containing interfering substances have COD values in the abovementioned range and have, for example, a cationic demand of more than 50 mg of polymer 1/l of white water.

When paper stocks containing interfering substances are used, the modified cationic polymers to be used according to the invention lead to a substantial reduction in the loads of interfering substances consisting of resins, stickies, white pitch and other anionic interfering substances, such as humic acids, wood extracts, lignin residues and ligninsulfate residues. Depending on the type of interfering substance, this manifests itself, for example, in lower turbidity of the filtrate water, reduced COD and fewer defects in the paper, a lower frequency of tearing of the paper web, shorter downtimes and cleaning times and a lower level of deposition on moving machine parts. The fixing agents thus help to increase the productivity of paper and cardboard machines. In many cases, the modified cationic polymers to be used according to the invention additionally support the retention and drainage and thus significantly improve the runnability of the machines in the papermaking process. The modified cationic polymers are used in papermaking, for example, in amounts of from 0.01 to 2, preferably from 0.02 to 1.0, % by weight, based on dry paper stock.

The fixing agents to be used according to the invention can, if required, be used with further conventional process chemicals for papermaking. Such process chemicals are, for example, retention aids. These are, for example, polyethyleneimines, polyamines having molar masses of more than 50,000, polyamides which may be grafted with ethyleneimine, polyetheramines, polyvinylimidazoles, polyvinylpyrrolidines, polyvinylimidazolines, polydialkyldiaminoalkyl vinyl ethers, and polydialkylaminoalkyl (meth)acrylates in protonated or quaternized form. Further suitable retention aids are, for example, polydiallyldialkylammonium halides, in particular polydiallyldimethylammonium chloride. Particularly preferred retention aids are the crosslinked polyamidoamines which are described in DE-C-2434816 and are obtainable by condensation of dicarboxylic acids, such as adipic acid, with polyalkylenepolyamines, such as diethylenetriamine, grafting of the polyamidoamines with ethyleneimine and reaction of the ethyleneimine-grafted products with dichlorohydrin ethers of polyalkylene glycols. Other commercial retention aids are, for example, copolymers of acrylamide or methacrylamide and dialkylaminoalkyl acrylates or dialkylaminoalkyl methacrylates, for example copolymers of acrylamide and N,N-dimethylaminoethyl acrylate or copolymers of acrylamide and N,N-diethylaminoethyl acrylate. The basic acrylates are preferably used in a form neutralized with acid or in quaternized form. The quaternization can be effected, for example, with methyl chloride, dimethyl sulfate or benzyl chloride. The cationic retention aids have, for example, Fikentscher K values (determined in 5% strength aqueous sodium chloride solution at a polymer concentration of 0.5% by weight and a temperature of 25° C.) of at least 140. The retention aids are usually used in papermaking in amounts of from 0.02 to 1.0% by weight, based on dry paper stock.

The K values were determined according to H. Fikentscher, Cellulose-Chemie, 13 (1932), 58–64 and 71–74, in 5% strength aqueous sodium chloride solution at a polymer concentration of 0.5% and a temperature of 25° C.

EXAMPLE 1

860 g of a 25% strength aqueous polyethyleneimine solution were initially taken in a 2 l four-necked flask which was equipped with a stirrer, a reflux condenser and an internal thermometer. The polyethyleneimine had an average molecular weight $M_w$ of 750,000 g/mol. The aqueous polymer solution was heated to 60° C. with vigorous stirring, and 7.03 g of the compound of the formula

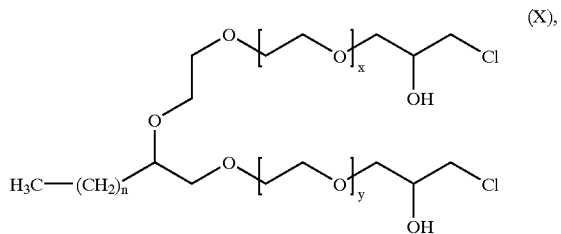

where n was 17–21, x was 9 and y was 10, were added at this temperature. The reaction mixture was stirred for 2 hours at this temperature. A slightly yellow, turbid solution having a viscosity of 460 mPas (measured in a Brookfield viscometer, spindle 2, 23° C.) was obtained.

EXAMPLE 2

190 g of a 13.5% strength aqueous polyvinylformamide solution were initially taken in a 1 l four-necked flask which was equipped with a stirrer, a reflux condenser and a thermometer. The polyvinylformamide had a K value of 89 ($M_w$=250,000 g/mol). The polymer solution was stirred and was heated to 80° C. 10 g of a 50% strength aqueous sodium hydroxide solution (125 mmol) were added in the course of 10 minutes and the reaction mixture was then stirred for a further 2 hours at 80° C. 200 g of an aqueous polymer solution having a polymer content of 11.8% were obtained. The polymer contained 67 mol % of vinylformamide units and 33 mol % of vinylamine units. The polymer solution was cooled to 60° C., and 0.054 g of the compound of the formula X described in Example 1 was added at this temperature. The reaction mixture was stirred for 2 hours at 60° C. and then cooled to room temperature. A slightly turbid solution was obtained.

EXAMPLE 3

500 g of a 9.6% strength aqueous solution of a modified polyethyleneimine which had been prepared according to Example 3 of DE-C-2434816 by grafting a polyamidoamine obtained from adipic acid and polyalkylenepolyamine with ethyleneimine and then crosslinking with-polyethylene glycol dichlorohydrin ether and had been subjected to an ultrafiltration were initially taken in a 1 l four-necked flask which was equipped with a stirrer, a reflux condenser and an internal thermometer, the high molecular weight fraction (more than 500 kD) being isolated. The modified polyethyleneimine was heated to 60° C. while stirring, and 0.530 g of the compound of the formula X described in Example 1 was added at this temperature. The reaction mixture was stirred for 2 hours at 60° C. and then cooled to room temperature. A pale yellow, slightly turbid solution having a viscosity of 112 mPa.s (Brookfield viscometer, spindle number 1, 23° C.) was obtained.

Comparative Example 1 (Example 1 of U.S. Pat. No. 5,536,370)

799 g of an anhydrous polyethyleneimine having an average molecular weight $M_w$ of 25,000 g/mol were initially taken in a flask which was equipped with a stirrer, a thermometer and a means for working under nitrogen and were heated to 140° C. in a stream of nitrogen, and 69 g of propionic acid were added in the course of 30 minutes. The temperature was then increased to 180° C. and the water of reaction was distilled off continuously over a period of 5 hours. 200 g of the polymer thus obtained were then diluted with 700 ml of water and heated to 70° C. 36.5 ml of a 21% strength aqueous solution of an α,ω-bischlorohydrin of a polyethylene glycol having a molecular weight of 400 g/mol were added a little at a time in the course of 3 hours. The reaction mixture was then stirred for a further 1 hour at 70° C. and then brought to pH 8 with 85 g of an 85% strength formic acid. 1018 g of a 20.7% strength polymer solution having a viscosity of 884 mPa.s (Brookfield viscometer, spindle number 2, 20° C.) were obtained.

EXAMPLE 4

0.16 g/l of an aqueous dispersion of latex particles which had been converted into a film and beaten up again was added as a sticky to an aqueous fiber suspension of TMP (thermomechanical pulp) having a consistency of 0.8%. The latex was an acrylate copolymer dispersion. The same amount (0.05%, based on TMP) of the polymer stated in each case in Table 1 was added in each case to samples of this paper stock, and, after thorough mixing, paper sheets were formed on a Rapid-Köthen sheet former. The filtrate was tested for the particle content with the aid of a laser-optical method, cf. Nordic Pulp & Paper Research Journal, No. 1, 1994, 9, pages 26–30 and 36). Of decisive importance for the efficiency of the fixing agent is the relative total volume of the unfixed stickies with an added amount of fixing agent of 0.05% of polymer, because this amount corresponds roughly to the amounts used in the paper production process. The lower this value, the more efficient is the fixing agent.

TABLE 1

| Polymer sample according to | Unfixed sticky volume in the filtrate [%] |
|---|---|
| Example 1 | 12 |
| Example 2 | 9 |
| Example 3 | 29 |
| Comparative Example 1 | 38 |

EXAMPLE 5

Example 4 was repeated, except that latex particles based on a styrene/butadiene copolymer were added in an amount of 0.16 g/l as interfering substance to TMP. The fixing agents used were the polymers stated in Table 2. After the addition of the polymers, the fiber was thoroughly mixed and drained on a Rapid-Köthen sheet former. The filtrate was then investigated for the content of sticky particles. Table 2 shows the relative volume of unfixed sticky particles.

TABLE 2

| Polymer sample according to | Unfixed sticky volume in the filtrate [%] |
|---|---|
| Example 1 | 24 |
| Example 2 | 16 |
| Example 3 | 25 |
| Comparative Example 1 | 44 |

We claim:

1. A modified cationic polymer prepared by reacting (a) water-soluble, polymeric compound containing NH groups and selected from the group consisting of polyalkylenepolyamines, polyamidoamines, polyamidoamines grafted with ethyleneimine and polymers containing vinylamine units with (b) a compound which is at least bifunctional with respect to NH groups and contains at least one alkyl or alkylene radical of at least 8 carbon atoms and, has a functional group selected from the group consisting of a halohydrin, epoxy, chloroformate, isocyanate group and a halogen atom.

2. The modified cationic polymer as claimed in claim 1, wherein the compounds (a) containing NH groups have molar masses of at least 1,000 g/mol.

3. A modified cationic polymer prepared by reacting (a) polyethyleneimines, polyamidoamines, polyamidoamines, polyamidoamines grafted with ethyleneimine, polymers containing vinylamine units or mixtures thereof with (b) at least one compound of the formula

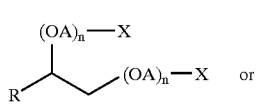

(IV)

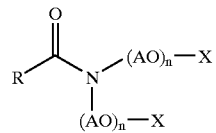

(V)

where R is a $C_8$- to $C_{30}$-alkyl or alkenyl A is $C_2$- to $C_4$-alkylene, n is 0–50 and X is a halohydrin, epoxy, carboxyl, chloroformate or isocyanate group or a halogen atom.

4. A process for preparing the modified cationic polymer of claim 1, comprising reacting:

(a) a water-soluble, polymeric compound containing NH groups and selected from the group consisting of polyalkylenepolyamines, polyamidoamines, polyamidoamines grafted with ethyleneimine and polymers containing vinylamine units with (b) at least one compound which is at least bifunctional with respect to NH groups and contains at least one alkyl or alkylene radical of at least 8 carbon atoms and, as functional group, a halohydrin, epoxy, chloroformate or isocyanate group or a halogen atom.

5. The process as claimed in claim 4, wherein the reaction of the compounds (a) and (b) is carried out in aqueous solution at from 20 to 100° C. with the formation of aqueous solutions or dispersions.

6. A process for preparing modified cationic polymers comprising reacting:

(a) compounds containing NH groups and selected from the group consisting of polyalkylenepolyamines, polyamidoamines, polyamidoamines, polyamidoamines grafted with ethyleneimine and polymers containing vinylamine units with (b) at least one compound of the formula

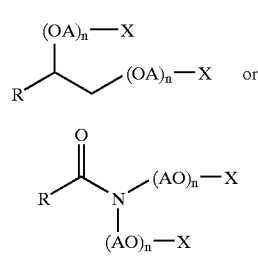

wherein R is a $C_8$- to $C_{30}$-alkyl or alkenyl, A is $C_2$-to $C_4$-alkylene, n is 0–50 and X is a halohydrin, epoxy, carboxyl, chloroformate or isocyanate group or a halogen atom.

7. The modified cationic polymer of claim 1, wherein compound (a) is a polymer containing vinylamine units selected from the group consisting of polymers or copolymers of a N-vinylcarboxamides of formula (I):

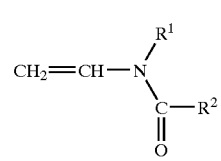

(I)

hydrolyzed with acids bases or enzymes, wherein $R^1$ and $R^2$ may be identical or different and are each hydrogen, or $C_1$- to $C_6$-alkyl.

8. The modified cationic polymer of claim 7, wherein the N-vinylcarboxamide of formula (I) is at least one compound selected from the group consisting of N-vinylformamide, N-vinyl-N-methyl formamide, N-vinylacetamide, N-vinyl-N-medhylacetamide, N-vinyl-N-ethylacetamide, N-vinyl-N-methylpropionamide, and N-vinylpropionamide.

9. The modified cationic polymer of claim 7, wherein the compound (a) is a copolymer of a N-vinylcarboxamide of formula (I) and at least one monoethylenically unsaturated monomer, hydrolyzed with acids bases or enzymes.

10. The modified cationic polymer of claim 9, wherein the monoethylenically unsaturated monomer is selected from the group consisting of vinyl esters of saturated carboxylic acids of 1 to 6 carbon atoms, ethylenically unsaturated $C_3$- to $C_6$-carboxylic acids, alkali metal and alkaline earth salts of ethylenically unsaturated $C_3$- to $C_6$-carboxylic acids, esters of ethylenically unsaturated $C_3$- to $C_6$ -carboxylic acids, amides of ethylenically unsaturated $C_3$- to $C_6$-carboxylic acids, nitriles of ethylenically unsaturated $C_3$- to $C_6$-carboxylic acids, polyalkylene glycol esters of ethylenically unsaturated $C_3$- to $C_6$-carboxylic acids, esters of ethylenically unsaturated $C_3$- to $C_6$-carboxylic acids with amino alcohols and acid salts and quaternary derivatives thereof, N-vinylpyrrolidone and acid salts and quaternary derivatives thereof, N-vinylcaprolactam and, acid salts and quaternary derivatives thereof, N-vinylimidazole and acid salts and quaternary derivatives thereof, substituted N-vinylimidazoles and acid salts and quaternary derivatives thereof, N-vinylimidazolines and acid salts and quaternary derivatives thereof, vinylsulfonic acid and alkali metal or ammonium salts thereof, allylsulfonic acid and alkali metal or ammonium salts thereof, methallylsulfonic acid and alkali metal or ammonium salts thereof, and styrenesulfonic acid and alkali metal or ammonium salts thereof.

11. The modified cationic polymer of claim 3, wherein the compound (b) has the formula (IV):

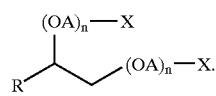

(IV)

12. The modified cationic polymer of claim 3, wherein compound (b) has the formula (V):

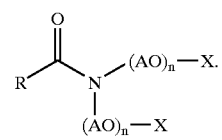

(V)

13. A modified cationic polymer prepared by reacting (a) a water-soluble, polymeric compound containing NH groups and selected from the group consisting of polyalkylenepolyamines, polyamidoamines, polyamidoamines grafted with ethyleneimine and polymers containing vinylamine units with a compound (b) which has the formula (VI):

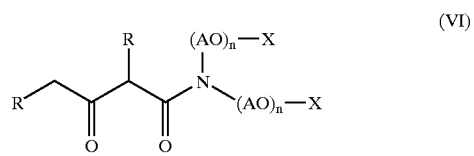

(VI)

and R is $C_8$- to $C_{30}$-alkyl or alkenyl, A is $C_2$- to $C_4$-alkylene, n is from 0 to 50 and X is a halohydrin, epoxy, carboxl, chloroformate, isocyanate, or halogen.

14. The modified cationic polymer of claim 1, wherein the compound (b) has the formula (VII):

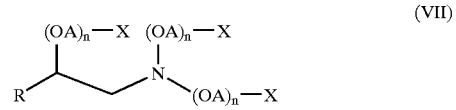

(VII)

and R is $C_8$- to $C_{30}$-alkyl or alkenyl, A is $C_2$- to $C_4$-alkylene, n is from 0 to 50 and X is a halohydrin, epoxy, carboxyl, chloroformate, isocyanate, or halogen.

15. The modified cationic polymer of claim 1, wherein the compound (b) has the formula (VIII):

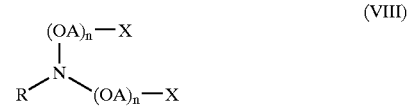

(VIII)

and R is $C_8$- to $C_{30}$-alkyl or alkenyl, A is $C_2$- to $C_4$-alkylene, n is from 0 to 50 and X is a halohydrin, epoxy, carboxyl, chloroformate, isocyanate, or halogen.

16. The modified cationic polymer of claim 1, wherein the compound (b) has the formula (IX):

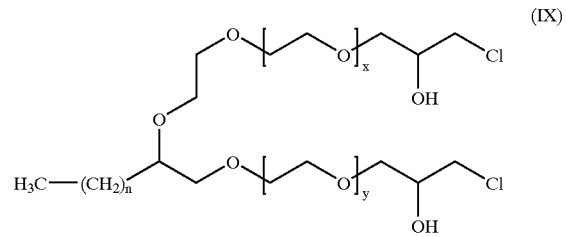

(IX)

and n is 5–27 and x and y are each 0–40.

17. A process for preparing the modified cationic polymer of claim 13 comprising reacting (a) water-soluble, polymeric compounds containing NH groups and selected from the group consisting of polyalkylenepolyamines, polyamidoamines, polyamidoamines grafted with ethyleneimine and polymers containing vinylamine units with a compound of formula (VI).

18. A process for preparing the modified cationic polymer of claim 14 comprising reacting (a) water-soluble, polymeric compounds containing NH groups and selected from the group consisting of polyalkylenepolyamines, polyamidoamines, polyamidoamines grafted with ethyleneimine and polymers containing vinylamine units with a compound of formula (VII).

19. A process for preparing the modified cationic polymer of claim 15 comprising reacting (a) water-soluble, polymeric compounds containing NH groups and selected from the group consisting of polyalkylenepolyamines, polyamidoamines, polyamidoamines grafted with ethyleneimine and polymers containing vinylamine units with a compound of formula (VIII).

20. A process for preparing the modified cationic polymer of claim 1 comprising reacting
   (a) water-soluble, polymeric compounds containing NH groups and selected from the group consisting of polyalkylenepolyamines, polyamidoamines, polyamidoamines grafted with ethyleneimine and polymers containing vinylamine units with a compound of formula (IX).

* * * * *